United States Patent
Ye et al.

(10) Patent No.: US 8,282,258 B2
(45) Date of Patent: Oct. 9, 2012

(54) BACKLIGHT MODULE

(75) Inventors: Zhi-Ting Ye, Miao Li County (TW);
Chang-Wei Yu, Nan Tou County (TW);
Nien-Ying Yang, Tai Chung County
(TW); Kuo-Jui Huang, Tai Chung
County (TW); Ying-Cheng Shih, Tai
Chung (TW); Hsiu-Ping Lee, Tai Chung
County (TW)

(73) Assignee: Wintek Corporation, Taichung (TW)

( * ) Notice: Subject to any disclaimer, the term of this patent is extended or adjusted under 35 U.S.C. 154(b) by 378 days.

(21) Appl. No.: 12/757,345

(22) Filed: Apr. 9, 2010

(65) Prior Publication Data
US 2010/0259949 A1 Oct. 14, 2010

(30) Foreign Application Priority Data

Apr. 9, 2009 (TW) ................................. 98111763 A
Mar. 19, 2010 (TW) ................................. 99108208 A

(51) Int. Cl.
*F21V 7/04* (2006.01)
(52) U.S. Cl. .......................... 362/607; 362/606; 313/113
(58) Field of Classification Search .................. 362/606, 362/607, 612, 615, 628, 633; 313/113
See application file for complete search history.

(56) References Cited

U.S. PATENT DOCUMENTS

| 2004/0076396 | A1 | 4/2004 | Suga | |
| 2004/0257791 | A1* | 12/2004 | Chen et al. | 362/31 |
| 2005/0254260 | A1* | 11/2005 | Li | 362/633 |
| 2007/0002590 | A1* | 1/2007 | Jang et al. | 362/633 |

* cited by examiner

*Primary Examiner* — Nimeshkumar Patel
*Assistant Examiner* — Mary Ellen Bowman
(74) *Attorney, Agent, or Firm* — Muncy, Geissler, Olds & Lowe, PLLC

(57) ABSTRACT

A backlight module includes a frame, a reflective sheet, a light guide plate, a light source, and an optical film set. The frame defines an accommodation space, and the reflective sheet is disposed in the accommodation space. The light guide plate is disposed in the accommodation space and on one surface of the reflective sheet. The optical film set is disposed one side of the light guide plate opposite the reflective sheet. The reflective sheet is hollowed out at a position overlapping the light source to form at least one opening so as to reduce light halos.

13 Claims, 7 Drawing Sheets

BACKLIGHT MODULE

BACKGROUND OF THE INVENTION (a) Field of the Invention

The invention relates to a backlight module having reduced light halos and improved luminous uniformity.

(b) Description of the Related Art

FIG. 1 shows a schematic diagram illustrating a conventional backlight module. Referring to FIG. 1, the backlight module 100 under a liquid crystal panel 102 includes a top brightness enhancement film (BEF) 104, a bottom brightness enhancement film 106, a light diffusion film 108, a light guide plate 110 and a reflective sheet 112. Since the current trend is towards more light and thin in the design of a liquid crystal display, the distance between an active display area (AA area) and a light source 114 in the backlight module 100 becomes shorter and shorter. Hence, in case such distance is smaller than 3 mm, light halos are formed on the liquid crystal panel 102 to seriously reduce luminous uniformity. Such deficiency can not be cured by spreading light-diffusing dots. Though a light-absorption adhesive may be used to improve luminous uniformity, the fabrication cost and assembly complexity are increased and the brightness of the backlight module 100 is reduced.

BRIEF SUMMARY OF THE INVENTION

In light of the above-mentioned problem, one object of the invention is to provide an a backlight module having reduced light halos and improved luminous uniformity.

According to an embodiment of the invention, a backlight module includes a frame, a reflective sheet, a light guide plate, a light source, and an optical film set. The frame defines an accommodation space, and the reflective sheet is disposed in the accommodation space. The light guide plate is disposed in the accommodation space and on one surface of the reflective sheet. The light source is disposed on one side of the light guide plate, and the optical film set is disposed on another side of the light guide plate opposite the reflective sheet. The reflective sheet is hollowed out at a position overlapping the light source to form at least one opening so as to reduce light halos and improved luminous uniformity as a result, and the area of the opening is 0.25 to 2 times as much of a projection area on which the light source projects on the reflective sheet.

According to another embodiment of the invention, a backlight module includes a positioning member, a light guide plate, a light source, and an optical film set. The positioning member defines an accommodation space, and the light guide plate is disposed in the accommodation space. The light source is disposed on one side of the light guide plate, and the optical film set is disposed on one side of the light guide plate and confined in the positioning member. The positioning member is hollowed out at a position overlapping the light source to form at least one opening so as to reduce light halos and improved luminous uniformity as a result.

In one embodiment, the area of each opening is 0.25 to 2 times as much of a projection area on which a corresponding light-emitting diode projects on the positioning member. The positioning member includes a frame and a back plate, the optical film set and the back plate are disposed on two opposite sides of the light guide plate, and the opening is formed on the frame or the back plate.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

The above and other technical content, characteristics, and effects of the invention will be described in details with reference to the drawings. For clarity, the wording related to direction, such as up, down, left, right, front, back, etc., is merely used to describe the direction with respect to the drawings but does not limit the scope of the invention.

Figure 1:
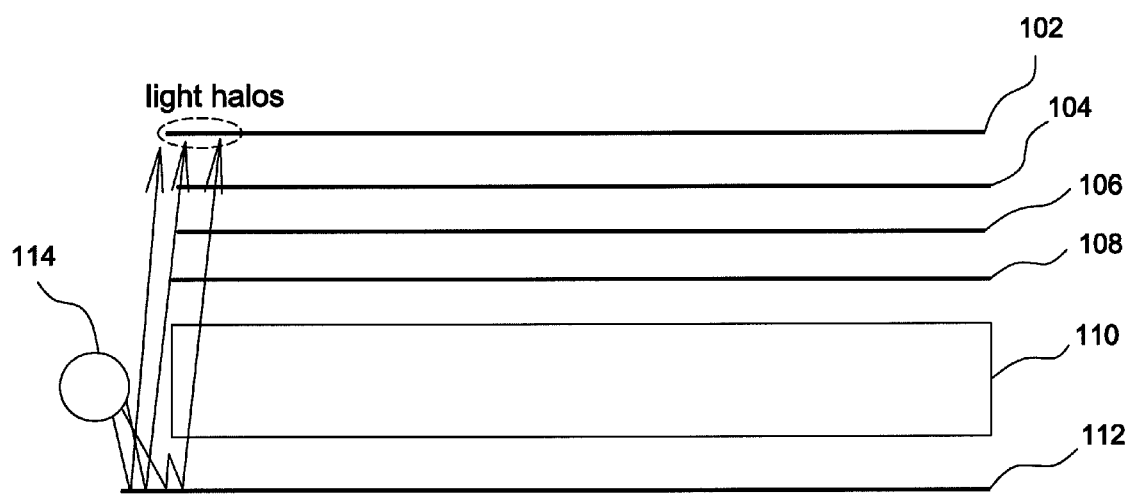
FIG. 1 shows a schematic diagram illustrating a conventional backlight module.
Figure 2:
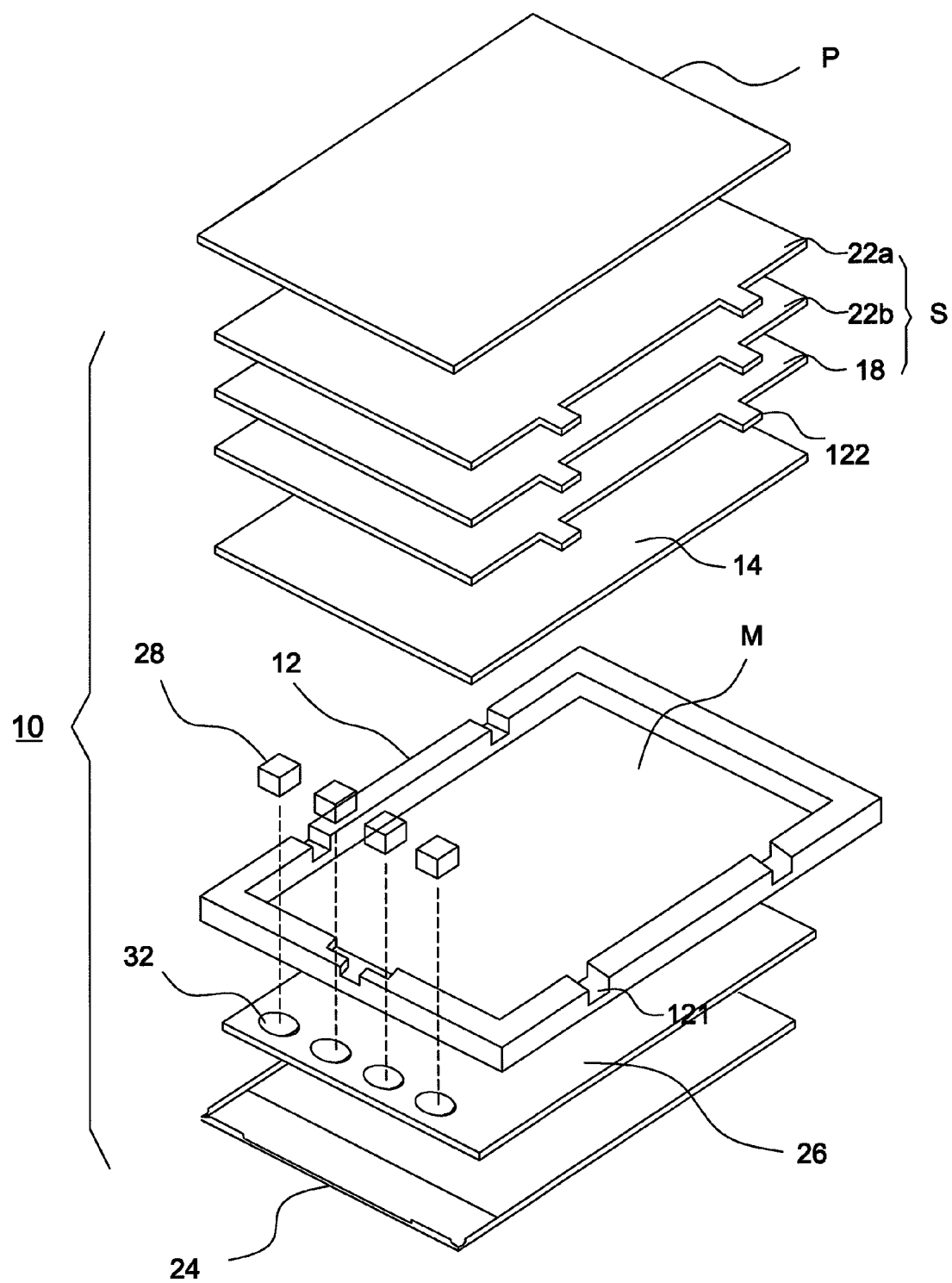
FIG. 2 shows an exploded diagram of a backlight module according to an embodiment of the invention.

FIG. 2 shows an exploded diagram of a backlight module according to an embodiment of the invention. Referring to FIG. 2, a liquid crystal panel P is on the top of the backlight module 10. In one embodiment, the backlight module 10 includes a frame 12, a light guide plate 14, and an optical film set S. The optical film set S may include a light diffusion film 18, an X-axis prismatic brightness enhancement film (BEF) 22a, and a Y-axis prismatic BEF 22b. The frame 12 defines an accommodation space M and has multiple notches 121. Each optical film has a protrusion 122 formed at a position corresponding to a notch 121. Hence, through the alignment of the notch 121 and the protrusion 122, the optical film set S is confined in a horizontal plane of the frame 12. A back plate 24 under the frame 12 cooperates with the frame 12 to fix each optical member, and a reflective sheet 26 is disposed under the accommodation space M of the frame 12 to reflect emitting light beams of light emitting diodes 28. The light guide plate 14 is disposed in the accommodation space M and on one surface of the reflective sheet 26. Multiple light emitting diodes 28 are arranged on one side of the light guide plate 14, and the optical film set S is disposed on one side of the light guide plate 14 opposite the reflective sheet 26. In this embodiment, the reflective sheet 26 is hollowed out at a position overlapping each light emitting diode 28 to form at least one opening 32. The number of openings 32 may be identical to the number of the light emitting diodes 28, but this is not limited. Though a larger area of each opening may more effectively reduce light halos and provide better visual effect, the possible decrease in the overall brightness should be also considered. Hence, the area of each opening 32 that corresponds to a light emitting diode 28 is preferably set as 0.25 to 2 times as much of a projection area on which the light emitting diode 28 projects on the reflective sheet 26.

Figure 3:
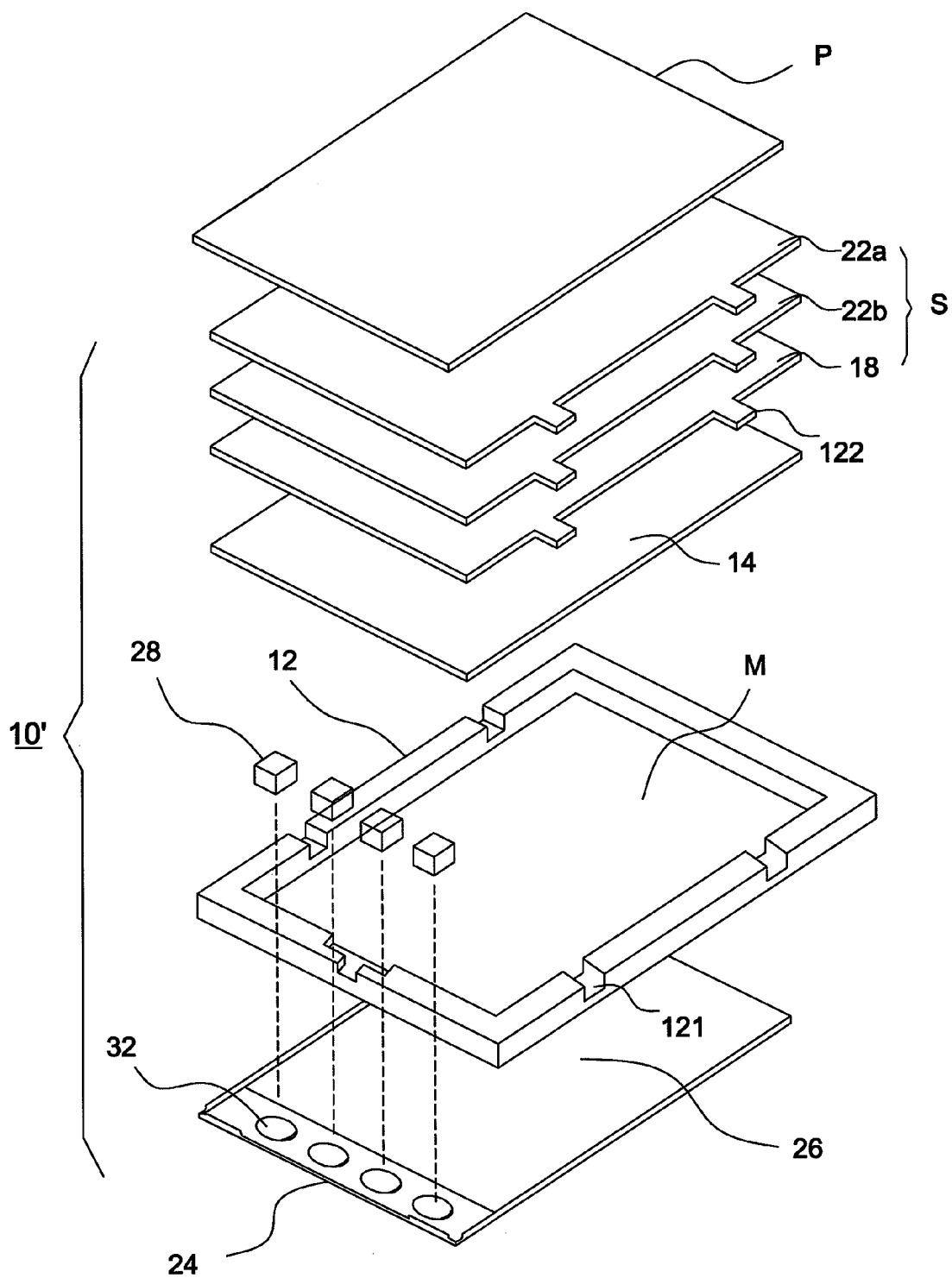
FIG. 3 shows an exploded diagram of a backlight module according to another embodiment of the invention.

FIG. 3 shows an exploded diagram of a backlight module according to another embodiment of the invention. Note the openings 32 are not limited to be formed on the reflective sheet 26. Referring to FIG. 3, in a backlight module 10', a back plate 24 and an optical film set S are respectively disposed on two opposite sides of a light guide plate 14. In this embodiment, the openings 32 are formed on the back plate 24 instead of a reflective sheet 26 at a position overlapping the light emitting diodes 28 to similarly reduce light halos. Further, though optical films are confined in the frame 12 and the back plate 24 in this embodiment, this is not limited. In an alternate embodiment, optical films may be confined in a single member or a combination of other elements. As long as the member for positioning the optical films is hollowed out at a position overlapping the light emitting diodes 28 to form openings 32, the light halos are allowed to be reduced.

Figure 4C:
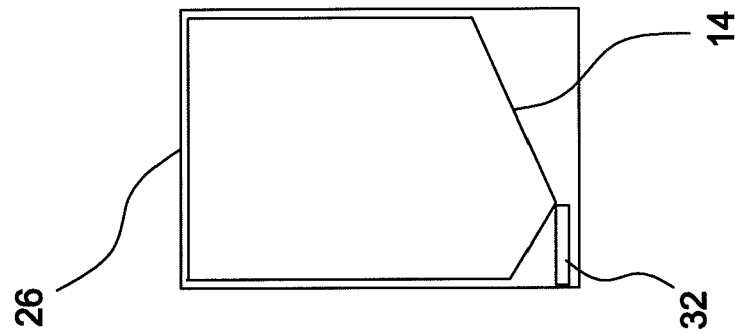
FIGS. 4A-4C show schematic diagrams illustrating different positions of openings.
Figure 4B:
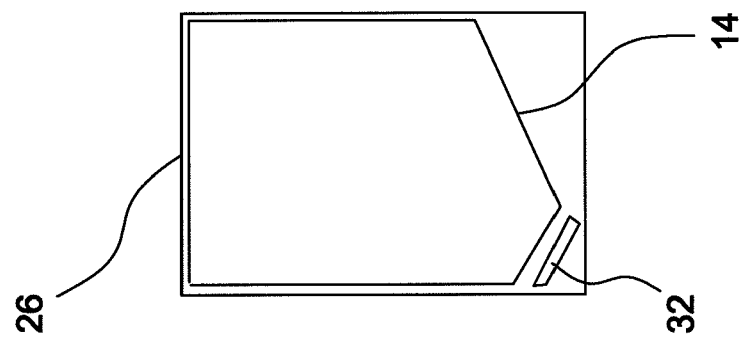
Figure 4A:
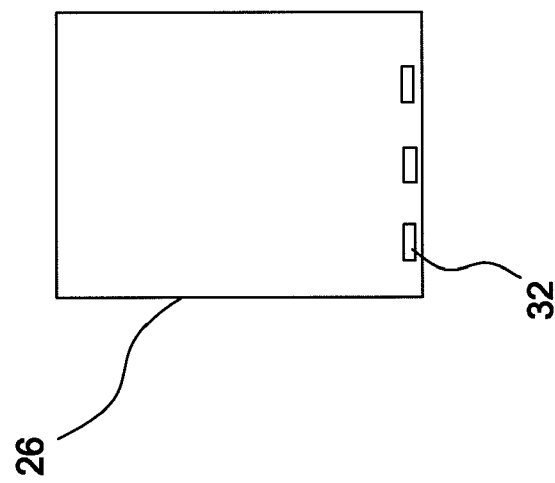
Figure 5:
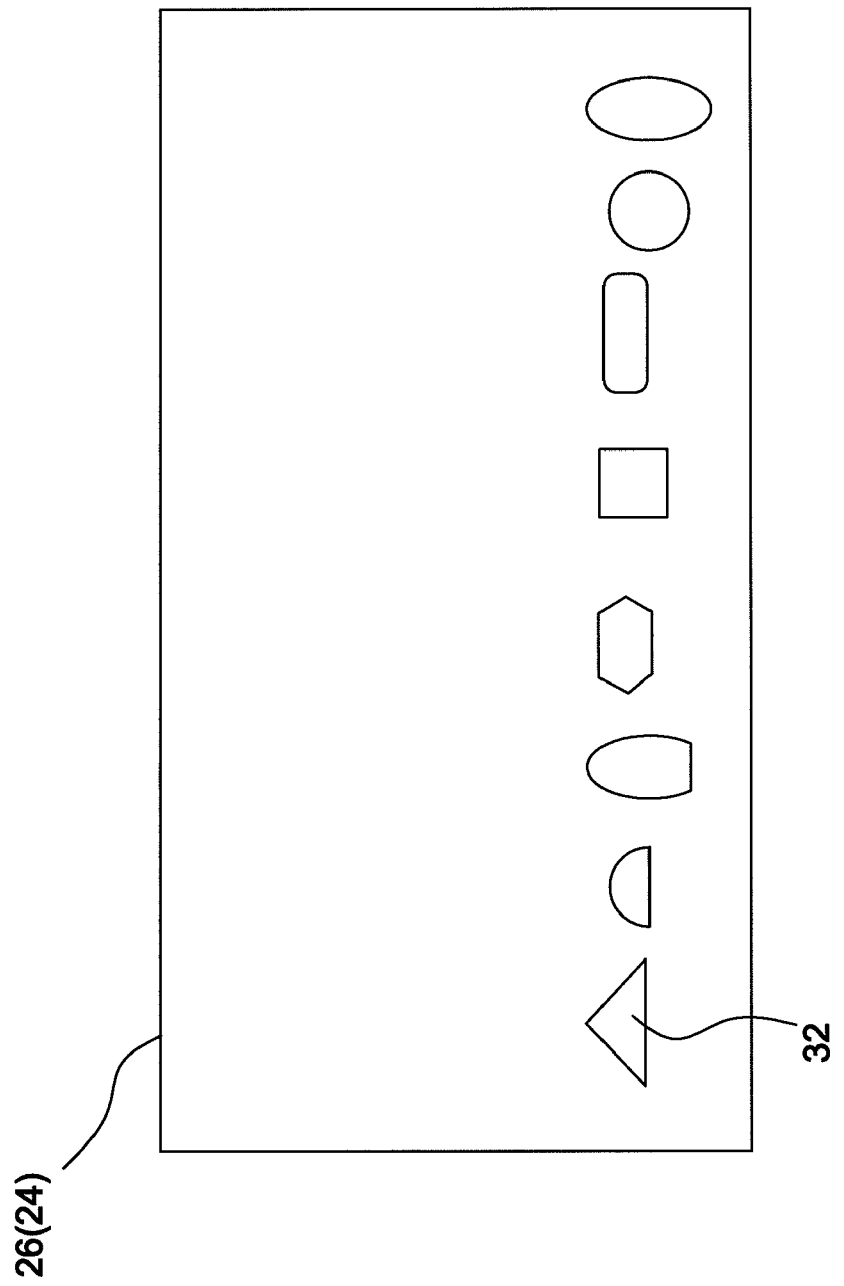
FIG. 5 shows a schematic diagram illustrating different shapes of openings.

Besides, the position of each opening 32 is not limited as long as it is corresponding to a light source. For example, as shown in FIG. 4A, multiple openings 32 are parallel to a light source and arranged in a row along one side of a reflective sheet 26. Alternatively, an opening is obliquely (FIG. 4B) or horizontally (FIG. 4C) formed on a corner of the reflective sheet 26. In addition, the number and shape of openings 32 are not limited. For example, as shown in FIG. 5, the opening 32 may be in the shape of a polygon, a circle, an ellipse, a semi-circle, a semi-ellipse, an arc plus a line segment, or a combination of at least two of them.

Figures 6A, 6B:
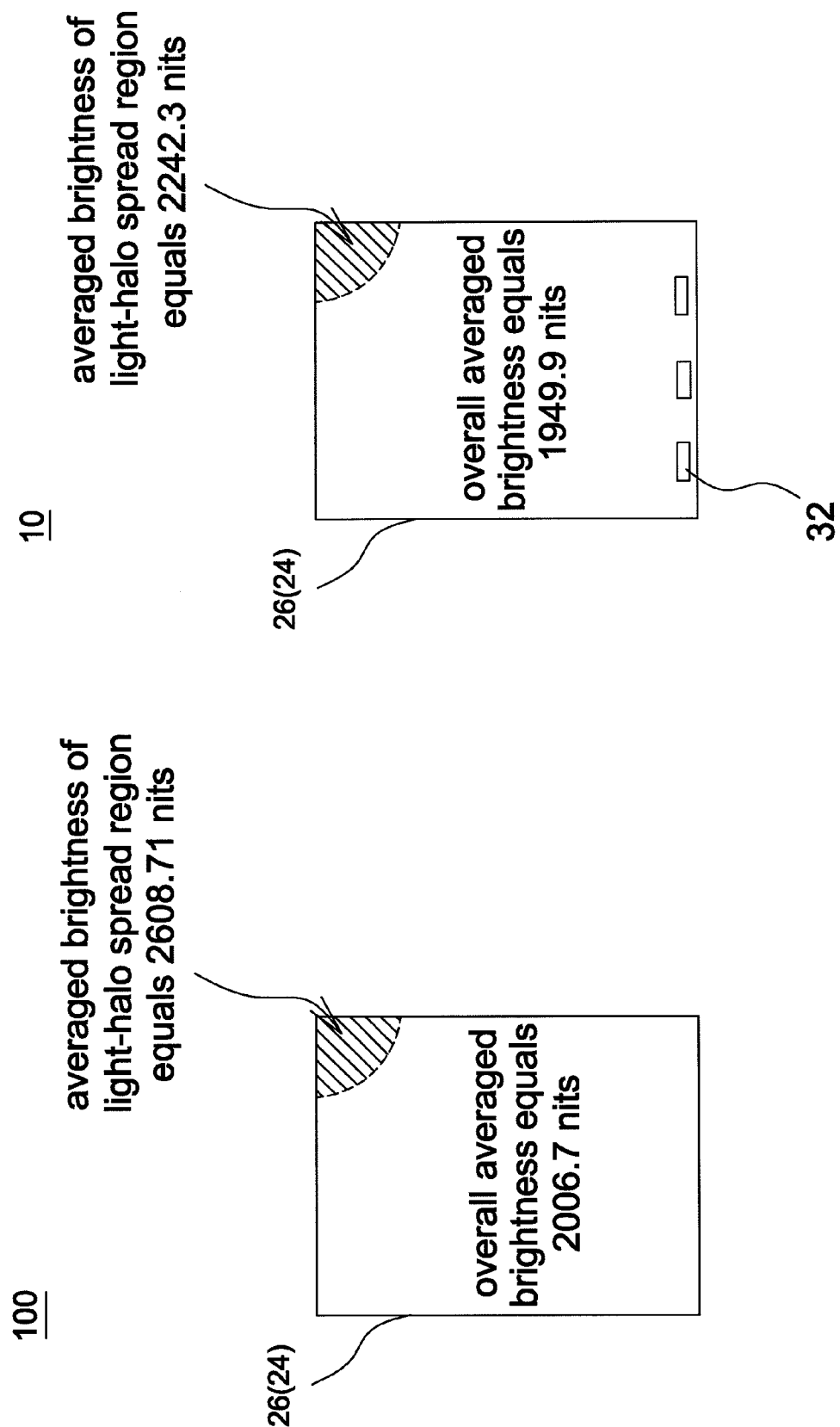
FIG. 6A shows a schematic diagram illustrating the brightness distribution of a conventional backlight module.
FIG. 6B shows a schematic diagram illustrating the brightness distribution of a backlight module according to an embodiment of the invention.
Figure 7B:
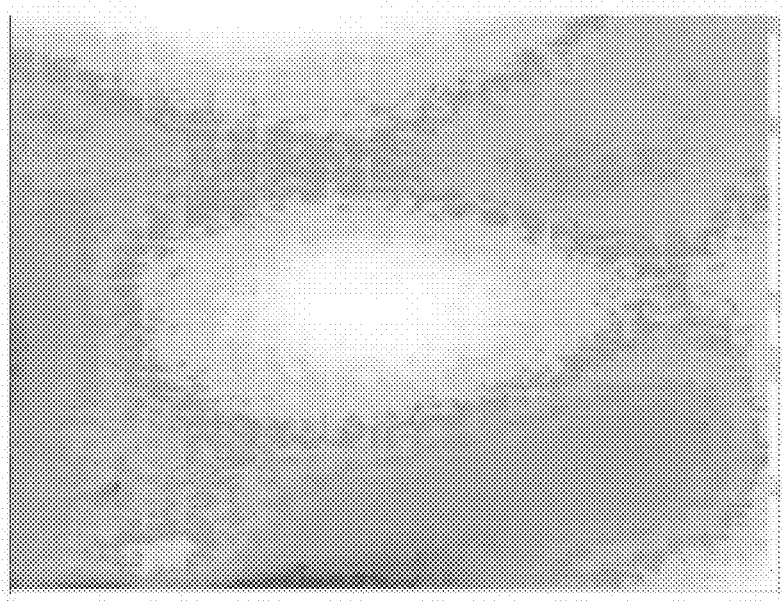
FIG. 7B shows the visual effect of FIG. 6B.
Figure 7A:
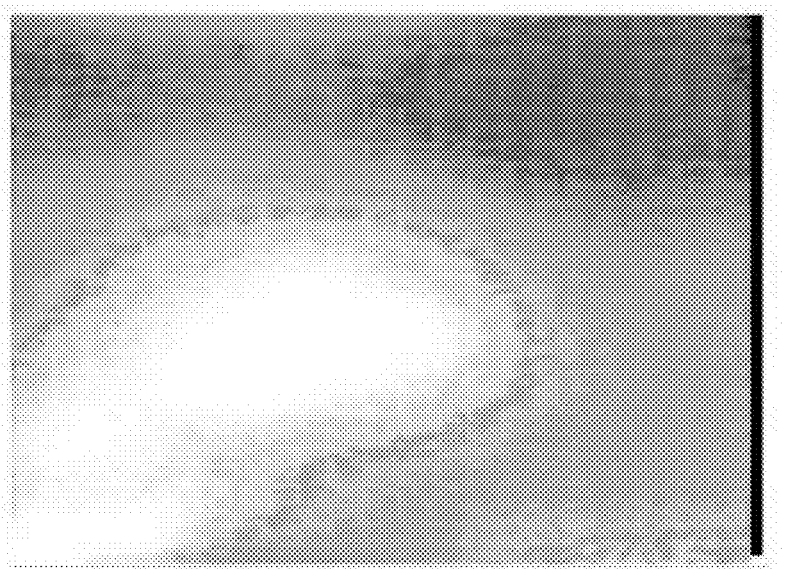
FIG. 7A shows the visual effect of FIG. 6A.

FIG. 6A shows a schematic diagram illustrating the brightness distribution of a conventional backlight module 100. FIG. 6B shows a schematic diagram illustrating the brightness distribution of a backlight module 10 according to an embodiment of the invention, where openings are formed on the reflective sheet 26 or the back plate 24. It can be clearly seen from the simulation results shown in FIG. 6A and FIG. 6B, according to the design of forming openings, an averaged brightness of a light-halo spread region is considerably decreased from 2608.71 nits (cd/m2) to 2242.3 nits (cd/m2). Therefore, the light halos are indeed reduced to improve visual effect. FIG. 7A illustrates the visual effect of a backlight module without openings shown in FIG. 6A, and FIG. 7B illustrates the visual effect of a backlight module with openings shown in FIG. 6B. It can be clearly seen from these figures the light halos are obviously reduced to improve visual effect, according to the above embodiments of the invention.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A backlight module, comprising:
a frame for defining an accommodation space;
a reflective sheet disposed in the accommodation space of the frame;
a light guide plate disposed in the accommodation space and on one surface of the reflective sheet;
a light source disposed on one side of the light guide plate; and
an optical film set disposed on another side of the light guide plate opposite the reflective sheet;
wherein the reflective sheet is hollowed out at a position overlapping the light source to form at least one opening so as to reduce light halos, and the area of the opening is 0.25 to 2 times as much of a projection area on which the light source projects on the reflective sheet.

2. The backlight module as claimed in claim 1, wherein the reflective sheet has multiple openings, the light source comprises multiple light emitting diodes, and the number of the openings is identical to the number of the light emitting diodes.

3. The backlight module as claimed in claim 1, wherein the optical film set comprises at least one light diffusion film and at least one prismatic brightness enhancement film.

4. The backlight module as claimed in claim 1, wherein the frame has at least one notch and the optical film set has at least one protrusion formed at a position corresponding to the notch.

5. The backlight module as claimed in claim 1, wherein the opening is formed on a corner of the reflective sheet.

6. The backlight module as claimed in claim 1, wherein the reflective sheet has a plurality of openings arranged in row along one side of the reflective sheet.

7. A backlight module, comprising:
a positioning member for defining an accommodation space;
a light guide plate disposed in the accommodation space;
a light source disposed on one side of the light guide plate; and
an optical film set disposed on one side of the light guide plate and confined in the positioning member;
wherein the positioning member is hollowed out at a position overlapping the light source to form at least one opening so as to reduce light halos.

8. The backlight module as claimed in claim 7, wherein the positioning member comprises a frame and a back plate, the optical film set and the back plate are disposed on two opposite sides of the light guide plate, and the opening is formed on the frame.

9. The backlight module as claimed in claim 7, wherein the positioning member comprises a frame and a back plate, the optical film set and the back plate are disposed on two opposite sides of the light guide plate, and the opening is formed on the back plate.

10. The backlight module as claimed in claim 7, wherein the light source comprises multiple light emitting diodes, and the number of the openings is identical to the number of the light emitting diodes.

11. The backlight module as claimed in claim 10, wherein the area of each opening is 0.25 to 2 times as much of a projection area on which a corresponding light-emitting diode projects on the positioning member.

12. The backlight module as claimed in claim 7, wherein the optical film set comprises at least one light diffusion film and at least one prismatic brightness enhancement film.

13. The backlight module as claimed in claim 7, wherein the positioning member has at least one notch and the optical film set has at least one protrusion formed at a position corresponding to the notch.

* * * * *